United States Patent [19] [11] 4,389,359
Brunt et al. [45] Jun. 21, 1983

[54] METHODS OF MAKING ASBESTOS-FREE, GLASS FIBRE REINFORCED, CEMENT COMPOSITE PRODUCTS AND THE PRODUCTS OF SUCH METHODS

[75] Inventors: William H. Brunt, Manchester; Kenneth C. Thatcher, Wigan, both of England

[73] Assignee: Tegral Technology Limited, Dublin, Ireland

[21] Appl. No.: 244,579

[22] Filed: Mar. 17, 1981

[30] Foreign Application Priority Data

Mar. 18, 1980 [IE] Ireland .................................. 552/80

[51] Int. Cl.[3] .............................................. C04B 35/58

[52] U.S. Cl. ........................................ 264/69; 264/86; 264/333

[58] Field of Search ........................... 264/333, 86, 69; 106/93, 99

[56] References Cited

U.S. PATENT DOCUMENTS 3,532,781 10/1970 Shannon ............................. 264/333
4,257,993 3/1981 Schemel ............................. 264/333

OTHER PUBLICATIONS

Lankard, "Fiber Reinforced Cement-Based Composites", *Cer. Bull.,* pp. 272–276, vol. 54, No. 3 (1975).

*Primary Examiner*—John A. Parrish
*Attorney, Agent, or Firm*—Sughrue, Mion, Zinn, Macpeak & Seas

[57] ABSTRACT

A method is provided for making a cement composite product such as a flat or profiled sheet, or a pipe, containing glass fibre as reinforcement instead of the traditional asbestos, wherein a cement and water slurry of flowable consistency is made with high shear agitation, the glass fibre is mixed with the slurry in a static mixing apparatus (i.e. having no moving parts) by bringing together flows of the slurry and of the glass fibre and then altering the path of the conjoined flow, and the glass fibre-containing mixture is immediately subjected to the conventional deposition on a water-permeable web, formation of a profile if desired, drainage of the water from the slurry through the web, and curing the deposited cement to form the product.

18 Claims, 7 Drawing Figures

Figure 1:
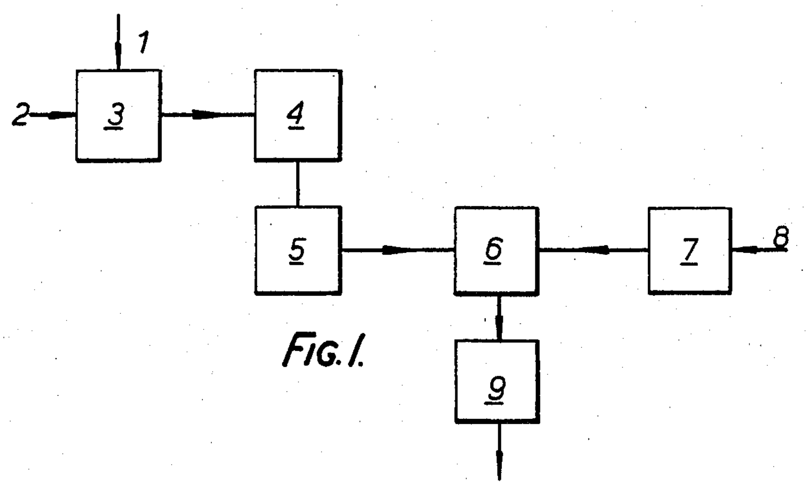

METHODS OF MAKING ASBESTOS-FREE, GLASS FIBRE REINFORCED, CEMENT COMPOSITE PRODUCTS AND THE PRODUCTS OF SUCH METHODS

This invention relates to methods of making asbestos-free, glass fibre reinforced, cement composite products, and to the products of such methods.

The manufacture of asbestos-reinforced cementitious products in sheet and pipe form has been carried on for over sixty years and equipment has been evolved over that period for manufacturing such products. It is desirable to replace asbestos so as to eliminate apparent hazards to health arising from the use of this material. In view of the expertise and equipment available as a result of the use of asbestos over such a long period, it is desirable that the replacement of asbestos be achieved without major changes in the equipment used, so as to avoid heavy capital expenditure on new equipment.

There are at present two major processes used in the asbestos-cement industry, both known by the names of their original devisers. These are the Hatschek and Magnani processes. A major difference between these processes is the density or solids content of the cement slurries used in the processes. The Hatschek process uses a relatively dilute slurry in comparison with the thicker and denser Magnani slurry. The present invention is directed to the replacement of asbestos by glass fibre as the reinforcing material in the operation of machines identified as being of the Magnani type or machines operating with slurries of similar characteristics.

In a Magnani machine for manufacturing sheets of asbestos-cement material, a continuous travelling web or belt made from a water-permeable material is supported along a horizontal moving bed having a perforated base through which suction is applied to the underside of the web, while a dense but flowable slurry of water and cement containing asbestos fibres is applied to the upper side of the web by means of a reciprocating distributor which travels back and forth above the web and is fed with the slurry from a large storage tank or holding vat whose contents are continuously stirred by a mechanical mixer. The distributor moves faster than the travelling web and thus builds up a sheet of asbestos cement on the web in thin incremental layers, which are de-watered by the suction applied to the underside of the web. Magnani sheet machines have been devised to produce both flat and profiled sheets. Such profiled sheets include those of a corrugated shape.

In a Magnani machine for manufacturing tubes or pipes of asbestos-cement material, a slurry is fed from a large continuously stirred holding vat to a slurry distributor pipe which supplies the slurry to the nip defined between a roller and the outer side of a water-permeable web wrapped around a rotating tubular mandrel, the mandrel having perforations over its surface so that suction can be applied through the mandrel to the inner or underside of the water permeable web to de-water the asbestos-cement product which is formed around the mandrel.

Asbestos has unique and valuable characteristics in that the asbestos fibres act as a carrier for cement and suffer little damage when mixed into a cement slurry and, in particular, during the time when that slurry is held in the continuously stirred holding vat before feeding it to a Magnani machine. Glass fibre does not act as a carrier for cement and suffers damage if subjected to intensive mixing into a cement slurry and if held under the mixing conditions necessary to maintain the fibre in dispersion for times comparable to those for which asbestos-cement slurries are commonly held in the holding vat in the operation of Magnani machines. A further problem that occurs with glass fibre when maintained in dispersion in a cement slurry for relatively long periods is that as time goes by there is an increasing risk of the fibre "balling up", that is the fibre agglomerating within the slurry into bundles or balls, rather than remaining uniformly dispersed. Damage to the glass fibres and balling-up both have disadvantageous effects on the strength of the cementitious product. It is important that the cementitious product, when cured, should have similar strength to an otherwise similar asbestos-containing cementitious product.

When one seeks to replace asbestos with glass fibre as a reinforcing material in cement products manufactured using a Magnani or similar type of asbestos-cement machine, it is first necessary to provide a glass fibre-containing cement slurry sufficiently close in characteristics to the asbestos-containing cement slurry to enable the same equipment and similar operating procedures to be used. Various methods have been proposed for producing a glass fibre/cement slurry of similar characteristics to an asbestos/cement slurry, such as the use of flocculating agents, cellulose and other additives. The use of glass fibre in different forms has also been proposed.

Glass fibre is available in two principal forms, namely continuous filament, in which the filaments are combined into strands which may be chopped to specified lengths and non-continuous single filament. The main division between these available forms of glass fibres is based on both the process and equipment used for their manufacture and the form in which they are produced. Glass fibre in continuous filament form is made by drawing single filaments from minute streams of molten glass issuing from orifices in the base of a container known as a bushing. The filaments are sized immediately after they are drawn and gathered into groups of filaments which are known as strands. Such strands may be chopped to provide discrete bundles of filaments arranged in a linear form and bonded together by the size. The length of the strands is determined at chopping and can be, for example, from 3 mm to 30 mm. The number of filaments is determined at the drawing stage and the filaments drawn from the bushing can either be gathered into one large strand or into several strands. These strands can be chopped while still wet with the size immediately after leaving the bushing and subsequently dried, but usually the single or multiple strands are wound into a "cake" which, after drying, may be unwound and the strands chopped to the desired length, in which case the strands separate from one another on chopping. Alternatively, the strand or strands unwound from the cake may be combined with strands from a number of other cakes to form a roving which is a grouping together of a plurality of strands. A roving may be fed to a chopping gun to produce chopped strands. Chopped strands produced in any of these ways are those referred to above as being used as a reinforcing material. They are already used in reinforcing both polymeric materials and inorganic cement matrices but, as indicated above, difficulties have been experienced in avoiding damage to such strands when operating with the type of machines used for making asbestos-cement products.

In the so-called discontinuous processes, the glass fibres are produced in single filament form and are not grouped into bundles or strands with a substantially linear arrangement. The products include glass wool and steam blown filaments. One well-known discontinuous process involves allowing molten glass to issue from orifices in the peripheral wall of a vessel rotating at high speed and attenuating the streams of glass by a blast of hot gas. Single discontinuous filaments can also be produced by attenuating the streams of glass issuing from orifices in the base of a platinum bushing with a blast of steam. The older discontinuous process known as the Hager process simply involves allowing a stream of molten glass to fall on to a rapidly spinning grooved disc. Single filament material can also be produced by adding to an aqueous medium chopped strands of continuous filament glass fibre which have been sized with an aqueous size but which have not been dried, or which have been sized with a size which after drying is still water-soluble or dispersible.

The glass fibre which is to act as a reinforcing material should be an alkali-resistant chopped-strand fibre, such as the material sold by Fibreglass Limited of St. Helens, Merseyside, under the trade name "Cem-FIL", but it has also been proposed to use, in addition, a proportion of single filament material to improve the characteristics of the slurry.

The principal object of the present invention is to enable one to incorporate glass fibre into a slurry of suitable characteristics for a Magnani or similar machine in such a manner as to avoid or minimise damage to the glass fibres and thereby to produce asbestos-free, glass fibre reinforced cement composite products of acceptable strength.

According to the present invention, a method of making an asbestos-free, glass fibre reinforced, cement composite product comprises the steps of mixing cement and water to form a flowable slurry in a high shear mixing apparatus, mixing the slurry with a predetermined proportion of glass fibre in a static mixing apparatus in which mixing is effected by bringing together flows of the slurry and glass fibre and then altering the path of the conjoined flow without the use of moving blades or arms, depositing the glass fibre containing slurry on a water-permeable web, draining the water from the slurry through the web to leave the glass fibre and cement thereon and curing the cement to form the glass fibre reinforced cement composite product.

By a higher shear mixing apparatus we mean an apparatus in which lumps and agglomerates of solids are effectively broken up and uniformly dispersed in the slurry.

By a static mixing apparatus we mean a mixing apparatus which operates without the use of moving elements such as blades or arms but relies upon the alteration of the flow paths of the materials to achieve mixing. By the use of such a static mixer in accordance with the invention to mix the glass fibre into the slurry, damage to the glass fibres is substantially avoided.

Preferably mixing of the slurry and glass fibre in the static mixing apparatus is effected by feeding the glass fibre on to the exposed surface of the slurry as it flows along a conduit and then changing the flow path of the slurry so that the said exposed surface is then covered by a substantial depth of the slurry. For example, the glass fibre may be fed on to the exposed surface as the slurry is fed along a downwardly inclined conduit and the flow path is then changed by causing the slurry to pass on to a second downwardly inclined conduit directed in the opposite direction from the first conduit as seen from above, so that the initially exposed surface then lies at or near the bottom of the flow. After the glass fibre has been fed on to the exposed surface, an initial mixing may be caused by a substantially cone-shaped restrictor in the conduit which causes the cement slurry to rise and surround the glass fibre on the exposed surface.

Although the alteration of the flow paths is the principal agent for mixing, the static mixing apparatus may be vibrated while the cement slurry and glass fibre are flowing through it.

Preferably, the flowable cement/water slurry formed in the high shear mixing apparatus is first supplied to a holding vat in which it is continuously stirred and is then supplied at a predetermined rate to the static mixing apparatus.

The method of the present invention is preferably carried out using an asbestos-cement machine of the Magnani type, wherein the glass fibre containing slurry is fed from the static mixing apparatus to a reservoir and thence to the slurry distributor of the Magnani machine which deposits the slurry on the water-permeable web of the Magnani machine. Preferably only sufficient slurry is fed to the reservoir to provide a continuous feed to the slurry distributor. The volume of slurry in the reservoir may be restricted by a depth control mechanism. Preferably the depth control mechanism senses when the depth of the slurry in the reservoir reaches a desired level and controls the supply of cement/water slurry and of chopped strand glass fibre to the static mixing apparatus to maintain the level substantially constant.

In this way, it is possible to use a small reservoir, with a much smaller content of prepared slurry than the holding vat of a conventional Magnani-type asbestos-cement machine. The time for which the slurry need be held in the reservoir is consequently much reduced. The danger of damage to the glass fibres or of balling-up of the fibres in the reservoir is accordingly largely avoided. At any given time, only the small quantity of slurry in the reservoir contains glass fibres, which are relatively expensive. If deposition of the slurry in the machine has to be stopped for a considerable length of time, so that there is a danger that the slurry will set before deposition and consequently have to be discarded, there is thus only a small quantity of expensive material at risk.

The glass fibre normally comprises an alkali-resistant chopped-strand fibre to act as the reinforcing material.

The glass fibre may be mixed into the slurry in a proportion to provide from 1% to 10%, preferably from 3% to 5%, by weight of glass fibres in the cement composite material.

The whole or a predetermined proportion of the alkali-resistant chopped-strand fibre may disperse into individual filaments in the cement slurry. Preferably the proportion of strands which disperse to strands which retain their integrity in the slurry is substantially 1:2.

The individual filaments of the glass fibre used may have a diameter range of 10 to 30 microns and a length of 2 to 4 mm.

Cellulose may be mixd with the cement and water in the high shear mixer to assist in formulating a slurry of the desired characteristics. The quantity which can be added is limited by the need in most cases to produce a final product with an adequate fire resistance. Cellulose contents of above 5% by weight will give products which are unacceptable in many applications as regards combustibility. We prefer when using cellulose to avoid exceeding a proportion of 2.5% by weight. Where cellulose is included, the slurry may be mixed so as to have a water:solids ratio of from 1:1 to 2:1.

The cement used is normally ordinary Portland cement. Limestone flour, fine sand, diatomaceous earth or pulverised fuel ash, or mixtures of these or other filler materials, may be mixed with the cement and water in the high shear mixer to reduce shrinkage of the final product during curing. We have also found that it is possible to mix mica flakes with the cement and water in the high shear mixer to give improved slurry flow properties. In general we find with glass fibre contents of the order of 2 to 4%, up to 5% by weight of mica flakes can be added without adverse effects.

Specific embodiments of the invention will now be described in more detail by way of example and with reference to the accompanying drawings, in which:

FIG. 1 is a block diagram illustrating the manner in which the glass fibre containing cement slurry is produced and fed to a Magnani-type asbestos-cement machine, in accordance with the method of the invention.

Figure 3:
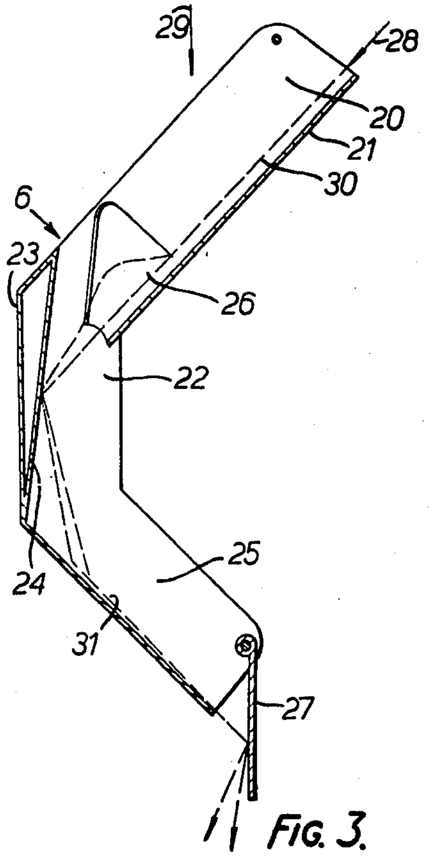
Figure 4:
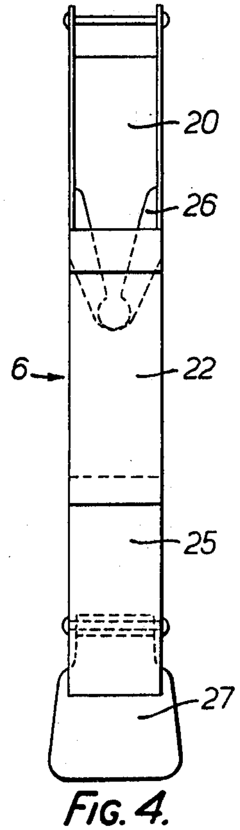
Figure 2:
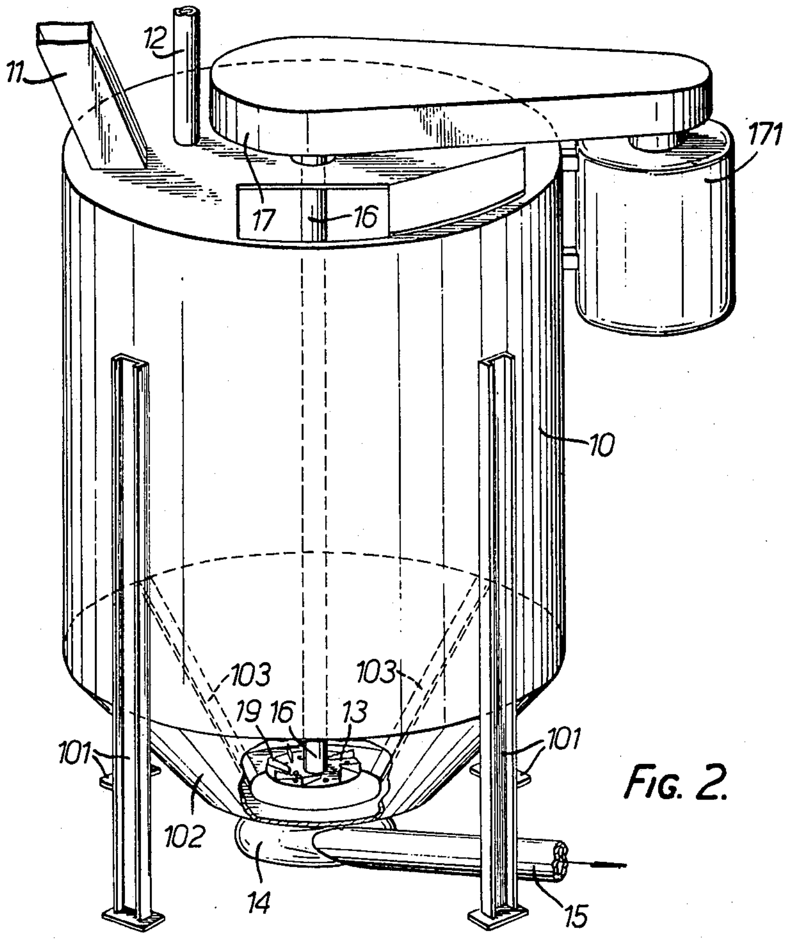
Figure 2A:
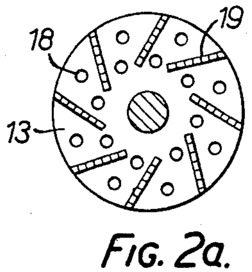
Figure 5:
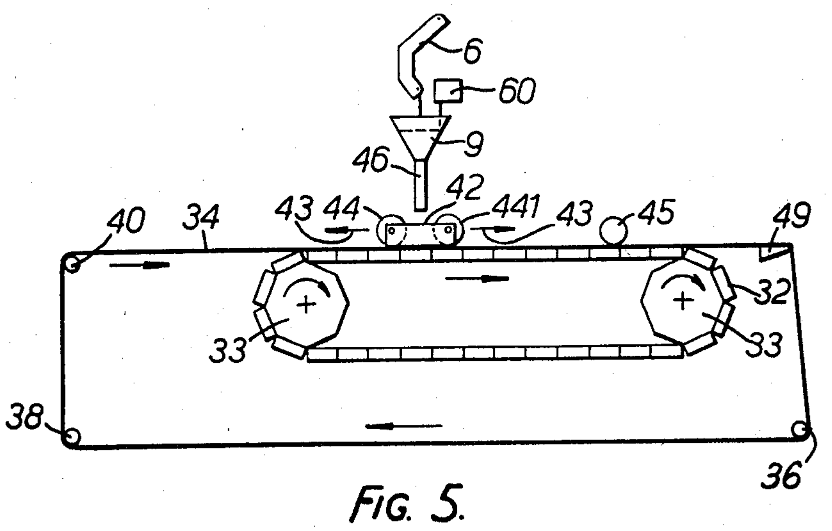
Figure 6:
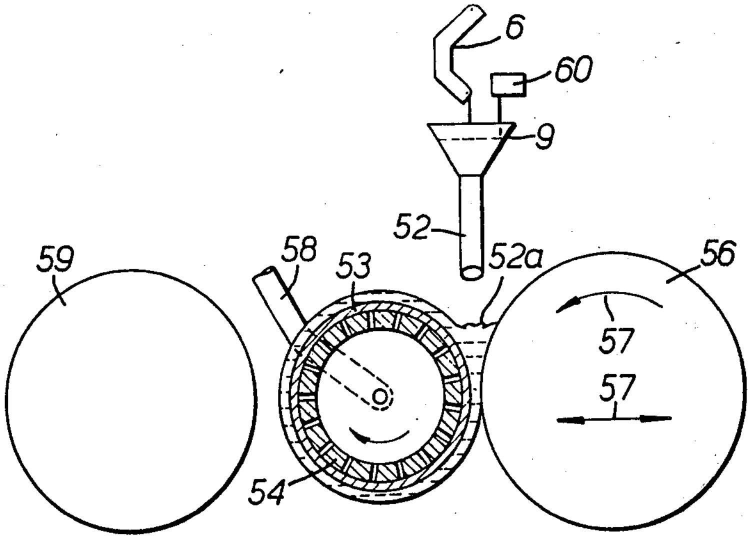

FIG. 2 is a perspective view, with parts broken away for clarity, of one type of high shear mixing apparatus which may be used for initial mixing of the cement/water slurry, FIG. 2*a* is a plan view of the rotary impeller of the apparatus of FIG. 2, FIG. 3 is a vertical cross-section of a static mixing apparatus for mixing the glass fibre into the cement/water slurry, FIG. 4 is an end view of the static mixer from the left hand side of FIG. 3, FIG. 5 is a diagrammatic elevational view of a Magnani-type machine for producing sheets of fibre-reinforced cement material, adapted to be supplied with glass fibre containing cement/water slurry for carrying out the method of the invention and FIG. 6 is a diagrammatic elevational view of a Magnani-type machine for producing pipes of fibre-reinforced cement material, also adapted to be supplied with glass fibre containing cement/water slurry for carrying out the method of the invention.

Referring to FIG. 1, ordinary Portland cement and any desired additives other than glass fibre, such as limestone flour, fine sand, pulverised fuel ash, mica flakes, diatomaceous earth and cellulose, are fed at 1 and water is fed at 2 to a high shear mixing apparatus 3 of conventional type to produce a cement/water slurry. The amount of cellulose will not normally exceed 5% by weight and is preferably not more than 2.5% by weight of the slurry. Up to 5% by weight of the mica flakes may be incorporated in the slurry. The water:solids ratio of the cellulose-containing slurry is preferably from 1:1 to 2:1, so that the slurry is flowable and suitable for use in a Magnani-type machine.

The cement/water slurry is fed to a continuously stirred vat or agitator 4 of conventional type, from which a pump 5 delivers it at a predetermined rate to a static mixing apparatus 6. A chopping apparatus 7 of conventional type receives glass fibre strands at 8 and delivers chopped strands at a predetermined rate to the static mixing apparatus 6.

The glass fibre is not mixed into the slurry with the other additives in the high shear mixing apparatus 3 because the glass fibre would suffer damage in the high shear mixing process and during subsequent holding in the continuously stirred vat or agitator 4. The static mixing apparatus 6, on the other hand, having no moving elements such as blades or arms, causes no appreciable damage to the glass fibre.

The glass fibre is normally of an alkali-resistant type, such as that sold by Fibreglass Limited under the Registered Trade Mark Cem-FIL and having the following composition in weight percent:

$SiO_2$: 62
$Na_2O$: 14.8
CaO: 5.6
$TiO_2$: 0.1
$ZrO_2$: 16.7
$Al_2O_3$: 0.8

The rates of delivery of the cement slurry and glass fibre to the static mixing apparatus are normally such as to give from 1% to 10%, preferably from 3% to 5%, by weight of glass fibre in the cement composite material. The whole or a proportion of the alkali-resistant glass fibre may be in the form of strands which have been sized with a water-soluble size which allows the strands to disperse into individual filaments in the cement/water slurry. Preferably the proportion of dispersible strands to strands which retain their integrity in the slurry is 1:2. The dispersible strands are preferably composed of filaments having a diameter of from 10 to 30 microns and a length of from 2 to 4 mm. The strands which retain their integrity may be composed of filaments of similar diameter but can be of greater length, e.g. up to 24 mm.

The slurry containing the desired proportion of glass fibres is fed from the static mixing apparatus 6 to a conical reservoir 9 and thence to the Magnani-type machine. The conical reservoir 9 is of much smaller dimensions than the conventional vat or agitator 4 and only holds sufficient slurry to ensure a constant feed to the Magnani-type machine.

The glass fibre containing slurry consequently remains in the reservoir 9 for only a short time before being fed to the Magnani-type machine. It is therefore in most cases unnecessary to provide for agitation of the contents of the reservoir 9 and the risk of damage to the glass fibres, or of "balling-up" of the fibres, is reduced or eliminated. The cement composite materials made from the slurry consequently do not suffer from strength defects due to such causes.

FIGS. 2 and 2*a* illustrate a conventional type of high shear mixing apparatus which is suitable for carrying out the initial mixing of the cement/water slurry.

The high shear mixer comprises a cylindrical container 10 supported by legs 101 and having an inlet chute 11 for solids and an inlet pipe 12 for water. The bottom 102 of the container 10 is frusto-conical and contains a rotary impeller 13 mounted above a centrifugal pump 14 which feeds slurry to the outlet pipe 15. Both the impeller 13 and pump 14 are driven by a vertical shaft 16. The shaft 16 may be driven from above, as shown, by a chain drive 17 and electric motor 171 or it may be driven from below. As shown particularly in FIG. 2*a*, the rotary impeller 13 is in the form of a flat disc having apertures 18 through which the slurry can pass and carrying a plurality of upstanding blades or teeth 19 disposed at an acute angle to the local radius of the impeller. The frusto-conical bottom 102 of the container is also provided with internal breaker bars 103, say four in number, to prevent formation of a vortex movement of the slurry. Cement and additives are fed into the container through inlet chute 11 and water through pipe 12, in the appropriate proportions, e.g. 75 Kg cement and 5 Kg of additives to 100 Kg water. The impeller 13 and pump 14 are rotated by means of the electric motor 171, which is typically of 75 KW, so as to produce true high shear mixing conditions in the mixing zone and to extract the slurry through the outlet pipe 15. True high shear mixing conditions, in which lumps and agglomerates of solids are effectively broken up and uniformly dispersed in the slurry, are produced when the power input exceeds 5 KW per 100 Kg of slurry. The cement/water slurry thus produced is preferably though not necessarily thixotropic.

Suitable high shear mixing apparatus is sold by Solvo International AB of Bromma, Sweden and by Black-Clawson Company, Shartle Pandia Division, of Middletown, Ohio, U.S.A.

FIGS. 3 and 4 illustrate a static mixer 6 for use in mixing the glass fibre into the cement/water slurry without causing appreciable damage to the glass fibre. The static mixer 6 works by bringing together flows of the slurry and glass fibre and then altering the path of the conjoined flow without the use of blades or arms or other moving elements. The static mixer illustrated comprises three sections, namely (a) a first downwardly inclined channel-shaped conduit 20 having a flat base 21, (b) a mid-section 22 having a substantially vertical back wall 23 and a steeply inclined wall 24 spaced therefrom and (c) a second channel-shaped conduit 25 which is also downwardly inclined but directed in the opposite direction from the first conduit 20, as seen from above. A substantially cone-shaped restrictor 26 is arranged as indicated at the lower end of the first conduit 20. A flat plate or fender 27 is pivotally mounted at the lower end of the second conduit 25.

The cement/water slurry from the high shear mixing apparatus is fed via the continuously stirred vat or agitator 4 and the pump 5 (FIG. 1) to the first conduit 20 as indicated by the arrow 28 and flows down the conduit. The glass fibre is fed as indicated by arrow 29 on to the exposed upper surface of the flow 30 of slurry in the first conduit 20. When the conjoined flow of slurry and glass fibre reaches the cone-shaped restrictor 26, the slurry is caused to rise and surround the glass fibre on the exposed surface of the slurry. When the conjoined flow of slurry and glass fibre leaves the first conduit 20, it impinges against the steeply inclined wall 24 of the mid-section 22 of the static mixer and mixing of the glass fibre into the slurry takes place. The slurry then falls on to the second inclined conduit 25 so that the initially exposed surface which carried the glass fibre now lies at or near the bottom of the flow 31 and further mixing is effected, while the weight of the slurry which is now predominantly on top of the glass fibre tends to "wet out" the fibre with the wet cement. Finally, the flow of glass fibre containing slurry impinges against the pivoted plate or fender 27, which causes further mixing, and falls into the conical reservoir 9 (FIG. 1). The static mixer described above has been found highly effective in incorporating proportions of 1% to 10% by weight of glass fibre into a water/cement slurry with adequate "wetting out" of the glass fibre by the wet cement and minimal damage to the glass fibre.

From the static mixer 6 and the conical reservoir 9, the glass fibre containing water/cement slurry is fed to the slurry distributor of a Magnani-type machine, e.g. as illustrated in FIG. 5 or FIG. 6.

FIG. 5 illustrates a Magnani-type machine for manufacturing fibre-reinforced cement sheets, the machine having a continuous perforated moving bed 32 passing around two rotatable rollers 33. The moving bed 32 is closed off at its sides and its interior is connected to a suction pump (not shown). A continuous water-permeable cloth belt 34 is guided around a number of rotatably mounted cylindrical rollers, three of which are shown and designated 36, 38 and 40. The cloth belt 34 is supported by the top of the moving bed 32 and passes between the top of the moving bed 32 and a slurry distributor in the form of a carriage 42 spaced above the belt 34. The carriage 42 is mounted for reciprocatory movement above the moving bed as shown by the arrows 43 and carries two rollers 44, 441, which extend transversely across the width of the belt 34. The upstream roller 44 is driven anticlockwise and the downstream roller 441 is driven clockwise. The carriage 42 is driven by a reversible motor (not shown) and the limits of its movement are set by means of limit switches (not shown).

Above the carriage 42 is a depending slurry pipe 46 mounted for longitudinal movement with the carriage 42. The slurry pipe 46 is connected via a valve (not shown) to the conical reservoir 9 which receives the glass fibre containing slurry from the static mixer 6. A depth sensor 60 is arranged to sense when the slurry in the reservoir 9 reaches a desired depth and to control the pump 5 and the chopping apparatus 7 as described below.

If it is desired to produce corrugated sheets, the rollers 44, 441 are provided with corrugated surfaces and a corrugated calendering roller 45 is located transversely across the belt 34 downstream of the carriage 42. The belt 34 during its passage above the moving bed 32 is given a corrugated formation which is complementary to the corrugations on the rollers 44, 441 and 45. The corrugations can be formed in the cloth belt 34 by using a moving bed 32 having a corrugated section and by employing a linear array of spaced rods upstream of the carriage 42. The corrugations are subsequently removed from the cloth belt 34 by passing it over a flat edged surface 49.

In operation, the pump 5 supplies cement/water slurry from the vat 4 to the static mixer 6, while the chopping apparatus 7 supplies chopped-strand glass fibres thereto at the appropriate rate. The static mixer 6 supplies glass-fibre containing slurry to the reservoir 9 until the sensor 60 senses the desired depth of slurry, whereupon the chopping apparatus 7 is first switched off and then the pump 5. The moving bed 32 and the cloth belt 34 are traversed around their respective paths slowly in the direction shown and pressure is reduced in the interior of moving bed 32. The valve in the slurry pipe 46 is opened to allow the slurry to flow out of the slurry pipe 46 into the slurry distributor carriage 42. As soon as the sensor 60 senses that the depth of slurry in the reservoir 9 has fallen below the desired level, it switches on first the pump 5 and then the chopping apparatus 7 to maintain a substantially constant level of glass fibre containing slurry in the reservoir 9 and a constant supply to the slurry distributor carriage 42. The space defined between the rollers 44, 441 is filled with a pool of slurry which is uniformly distributed on the belt 34 in incremental layers by the reciprocating movement of the carriage 42 so as to build up a sheet on the belt 34. The slurry conforms to the corrugated shape of the belt 34 and is passed beneath the corrugated calendering roller 45 which compresses the corrugated sheet of slurry to a desired thickness. The sheet of slurry is de-watered as it travels forward by the suction acting through the moving bed 32 and cloth belt 34 until the slurry reaches a sufficiently rigid state to be removed from the belt 34 at 49. The sheet of composite material thus produced is then cut into separate sheets which are subsequently conveyed away by a suction conveyor to be cured and stacked for maturing.

FIG. 6 illustrates a Magnani-type machine for manufacturing fibre-reinforced cement pipes.

The conical reservoir 9 which receives the slurry from the static mixer 6 is connected to a slurry distributor in the form of a pipe 52 which is located over a nip 52*a* defined between the outer surface of a water-permeable filter cloth 53 wrapped tightly around a mandrel 54 and a steel forming roller 56. The slurry distributor pipe 52 is reciprocable back and forth along the length of the nip 52*a*, i.e. perpendicular to the plane of the paper in FIG. 6. The depth sensor 60 is provided and arranged to operate as in the embodiment of FIG. 5. The roller 56 is movable in a horizontal plane, being urged to the left as seen in FIG. 6 and is rotatable anti-clockwise, as indicated by the arrows 57. Horizontal movement of the roller 56 to the right in FIG. 6 permits an increase in thickness of the fibre-reinforced cement material on the filter cloth 53 around the mandrel 54 to be accommodated whilst maintaining a compacting pressure against the material.

The mandrel 54, which is mounted for clockwise rotation (as shown in FIG. 6), is a hollow steel or cast iron tube and is perforated over its entire surface. The mandrel 54 has closed ends and has its interior connected by means of a suction pipe 58 to a suction pump (not shown).

The machine as illustrated also has a further roller 59 positioned at a fixed distance from the mandrel which serves to smooth the surface and compress the cement composite material when it reaches its desired thickness.

In operation, the glass fibre containing cement/water slurry is fed to the reservoir 9 and its depth is maintained substantially constant as described with reference to FIG. 5. The pressure within the mandrel 54 is reduced and the mandrel 54 is rotated clockwise at a slow speed. The slurry is then fed from the reservoir 9 through the pipe 52 to the nip between the filter cloth 53 on mandrel 54 and roller 56, so that incremental layers of slurry are built up on the filter cloth 53. The roller 56 smoothes the surface and compresses the slurry as it is deposited on the filter cloth whilst the suction applied through the mandrel 54 dewaters the slurry. The combination of the suction and the pressure applied by roller 56 gradually builds up a tough and dense homogeneous cylinder of the cement composite material on the filter cloth 53. The pressure imparts complete cohesion to the successive layers of the fibre reinforced cement composite material while roller 56 moves away from mandrel 54 until the desired thickness has been obtained, whereupon the roller 50 comes into action to complete the smoothing and compression of the cement composite material.

The mandrel 54 with the formed fibre-reinforced cement pipe is removed from the machine and transferred to a second unit where the mandrel 54 is withdrawn and the cement is allowed to cure. Wooden formers can be inserted in the pipe to maintain its true shape until the cement has fully cured.

In specific examples of the method of the invention, glass fibre reinforced cement pipes were made employing the apparatus of FIGS. 1, 2, 3, 4 and 6. Ordinary Portland cement and cellulose in the form of recycled cellulose were mixed with water to form a slurry in proportions to provide a water:solids ratio of 1:1 in the fibre-containing slurry fed to the Magnani-type machine of FIG. 6 and a proportion of 2% by weight of cellulose in the finished pipes. Certain of the pipes were made using Cem-FIL alkali-resistant glass fibres of the composition given above, in the form of strands chopped to a length of 3 mm substantially all of which dispersed into individual single filaments in the slurry, in an amount to constitute 3.4% by weight of the finished product (Mixture 1). Others of the pipes were made using a mixture of 1 part of such dispersible strands with 2 parts of strands of the same composition which were chopped to a length of 12 mm and which retain their integrity in the slurry, the total amount of glass fibre being such as to constitute 6% by weight of the finished product (Mixture 2). Finally, a number of otherwise similar pipes of a standard asbestos-cement material, containing substantially 10% by weight of asbestos in ordinary Portland cement in the finished product, were made for comparison. The pipes were supported in cradles and cured in air at 100% Relative Humidity for seven days and then stored for 21 days under cover in air under ambient conditions. The pipes were then tested by measuring the maximum crushing load which a 300 mm length would sustain and the hydraulic bursting pressure. The results are set out in the following Table.

TABLE

| Pipe Diameter (mm) | Wall Thickness (mm) | Crushing Load per 300 mm length (kN) | Hydraulic Bursting Pressure (kg/cm$^2$) | Density (g/cm$^3$) | Mixture |
|---|---|---|---|---|---|
| 125 | 10.2 | 3.84 | — | 1.42 | 1 |
| 125 | 9.7 | — | 6 | 1.42 | 1 |
| 125 | 9.1 | — | 6.5 | 1.44 | 2 |
| 125 | 9.9 | 4.11 | — | 1.44 | 2 |
| 125 | 10.2 | — | 7 | 1.5 | Standard Asbestos/cement |
| 125 | 10.4 | 3.84 | — | 1.5 | Standard Asbestos/cement |

Allowing for the variations in wall thickness, it will be seen that the pipes produced by the method of the present invention, employing glass fibre reinforcement, were equal or superior in strength to the conventional asbestos-cement pipes, as well as being lighter due to their lower density.

What is claimed is:

1. A method of making an asbestos-free, fiber reinforced, cement composite product using a Magnani-type asbestos-cement machine wherein a fiber-cement slurry is deposited from a reservoir by a slurry distributor onto a water-permeable web, water is drained from the slurry through the web and thereafter the composite product is cured, the improvements which comprise (a) substituting glass fiber for the asbestos;

(b) mixing cement and water to form a fiber free flowable slurry in a high shear mixing apparatus;

(c) mixing said fiber free flowable slurry with glass fiber by feeding the fiber onto an exposed surface of the slurry as the slurry flows along a conduit and then changing the flow path of the slurry so that said exposed surface becomes covered by a substantial depth of slurry whereby the glass fiber is incorporated into the slurry and completely surrounded by the slurry; and (d) feeding the slurry from step (c) to a reservoir from which it is delivered to the slurry distributor.

2. A method as recited in claim 1 wherein the glass fibre is fed on to the exposed surface as the slurry is fed along a downwardly inclined conduit and the flow path is then changed by causing the slurry to pass on to a second downwardly inclined conduit directed in the opposite direction from the first conduit as seen from above, so that the initially exposed surface of the slurry then lies at or near the bottom of the flow.

3. A method as recited in claim 1, wherein, after the glass fibre has been fed on to the exposed surface, an initial mixing is effected by a substantially cone-shaped restrictor in the conduit which causes the cement slurry beneath said exposed surface to rise and surround the glass fibre.

4. A method as recited in claim 1, wherein a static mixing apparatus is used in step (c) and is vibrated while the cement slurry and glass fibre are flowing through it.

5. A method as recited in claim 1, wherein the flowable cement/water slurry formed in the high shear mixing apparatus is first supplied to a holding vat in which said slurry is continuously stirred and is then supplied at a predetermined rate to step (c).

6. A method as recited in claim 1, wherein only sufficient slurry is fed to the reservoir to provide a continuous feed to the slurry distributor.

7. A method as recited in claim 6 wherein the volume of slurry in the reservoir is restricted by a depth control mechanism.

8. A method as recited in claim 7 wherein the depth control mechanism senses when the depth of the slurry in the reservoir reaches a desired level and controls the supply of cement/water slurry and of glass fibre to the step (c) to maintain said level substantially constant.

9. A method as recited in claim 8 wherein the glass fibre comprises an alkali-resistant chopped-strand fibre.

10. A method as recited in claim 9 wherein the glass fibre is mixed into the slurry in a proportion to provide from 1% to 10% by weight of glass fibres in the cement composite material.

11. A method as recited in claim 10 wherein the glass fibre is mixed into the slurry in a proportion to provide from 3% to 5% by weight of glass fibres in the cement composite product.

12. A method as recited in claim 11 wherein a predetermined proportion of the alkali-resistant chopped-strand fibre disperses into individual filaments in the cement slurry.

13. A method as recited in claim 12 wherein said proportion is substantially 1:3.

14. A method as recited in claim 12 wherein the individual filaments of the glass fibre used have a diameter range of 10 to 30 microns and a length range of 2 to 4 mm.

15. A method as recited in claim 1 which further comprises mixing cellulose with the cement and water in the high shear mixer, in an amount to provide not more than 5% by weight of cellulose in the cement composite product.

16. A method as recited in claim 1 wherein the slurry is mixed so as to have a water:solids ratio in the range from 1:1 to 2:1.

17. A method as recited in claim 1 wherein at least one ingredient selected from the group consist of limestone flour, fine sand, diatomaceous earth and pulverised fuel ash is mixed with the cement and water in the high shear mixer.

18. A method as recited in claim 1 wherein mica flakes are mixed with the cement and water in the high shear mixer in an amount to provide up to 5% by weight mica in the cement composite product.

* * * * *